Feb. 6, 1951 — A. KALITINSKY — 2,540,737
AIR VALVE FOR COMPRESSORS
Filed Jan. 30, 1945 — 4 Sheets-Sheet 1

FIG.I.

INVENTOR
Andrew Kalitinsky

INVENTOR
Andrew Kalitinsky

Patented Feb. 6, 1951

2,540,737

UNITED STATES PATENT OFFICE 2,540,737

AIR VALVE FOR COMPRESSORS

Andrew Kalitinsky, Eagleville, Conn., assignor to United Aircraft Corporation, East Hartford, Conn., a corporation of Delaware Application January 30, 1945, Serial No. 575,337

3 Claims. (Cl. 230—56)

This invention relates to air valves for compressors, particularly valves of the type shown in Huff Patent No. 1,599,414.

The valve structure of this patent includes a base having a seat for a valve plate which extends at an acute angle to the path of air through the valve. The valve plate is supported along one edge and is resilient to permit the valve plate to bend away from the seat in opening the valve. In adapting this type of valve to high speed compressors frequent valve failures have occurred from the impact of the free edge of the valve plate against the seat during closing of the valve. A feature of this invention is a balancing of the spring rate of the valve in proportion to the maximum operating speed of the compressor so as to avoid these failures.

A feature of the invention is the construction of the valve plate so that its natural frequency has a predetermined ratio to the frequency of the compressors.

The suction valve normally remains open for a greater part of each stroke than the discharge valve and may therefore have a slower opening and closing rate. A feature of this invention is the construction of the suction valve with a lower frequency than the discharge valve and with the frequency of both valves proportioned to the maximum compressor speed.

Valves of this type may be used in the compressor cylinders of free-piston units, the piston assemblies of which inherently have a relatively small range of frequency. A feature of the invention is the arrangement of the valves, both suction and discharge, so that the natural frequency of the valves has a predetermined ratio to the full-load or maximum frequency of the piston assembly.

Other objects and advantages will be apparent from the specification and claims, and from the accompanying drawings which illustrate an embodiment of the invention.

Figure 1:
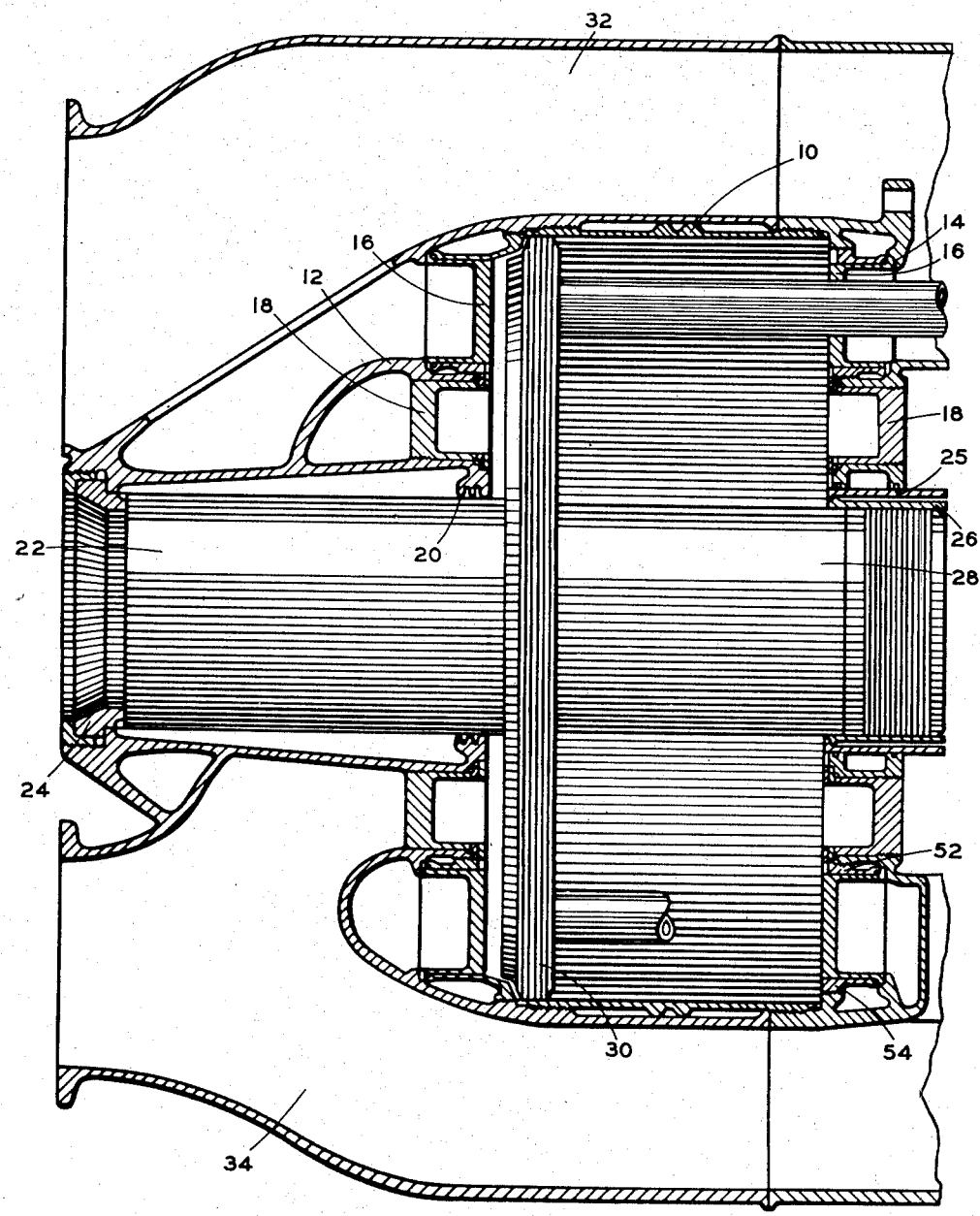
Fig. 1 is a sectional view through the compressor cylinder of a free-piston unit showing the valve structure.

The valve structure is shown in the compressor heads of a free-piston engine and compressor unit which may be the type shown in the copending Kalitinsky application, Serial No. 486,611. The compressor cylinder 10 has outer and inner cylinder heads 12 and 14 in which sets of both intake valves 16 and discharge valves 18 are mounted. Head 12 may have a central opening 20 for the sleeve 22 which in conjunction with a piston 24 fitting within the sleeve forms an air spring for moving the piston assembly to the right. Head 14 has a central opening 24 which receives the engine cylinder 26 in which the engine piston 28 attached to the compressor piston 30 is slidable. Sleeve 22 forms an integral part of the piston assembly.

The sets of valves 16 and 18 are arranged in rings around the central openings in the heads, the discharge valves being preferably between the intake valves and the central openings. The intake valves are mounted to permit gas to flow into the cylinder from an intake manifold 32 and then discharge valves permit gas to flow out of the cylinder into scavenge manifold 34. The valves are similar and the intake valves will be described in detail.

Figure 2:
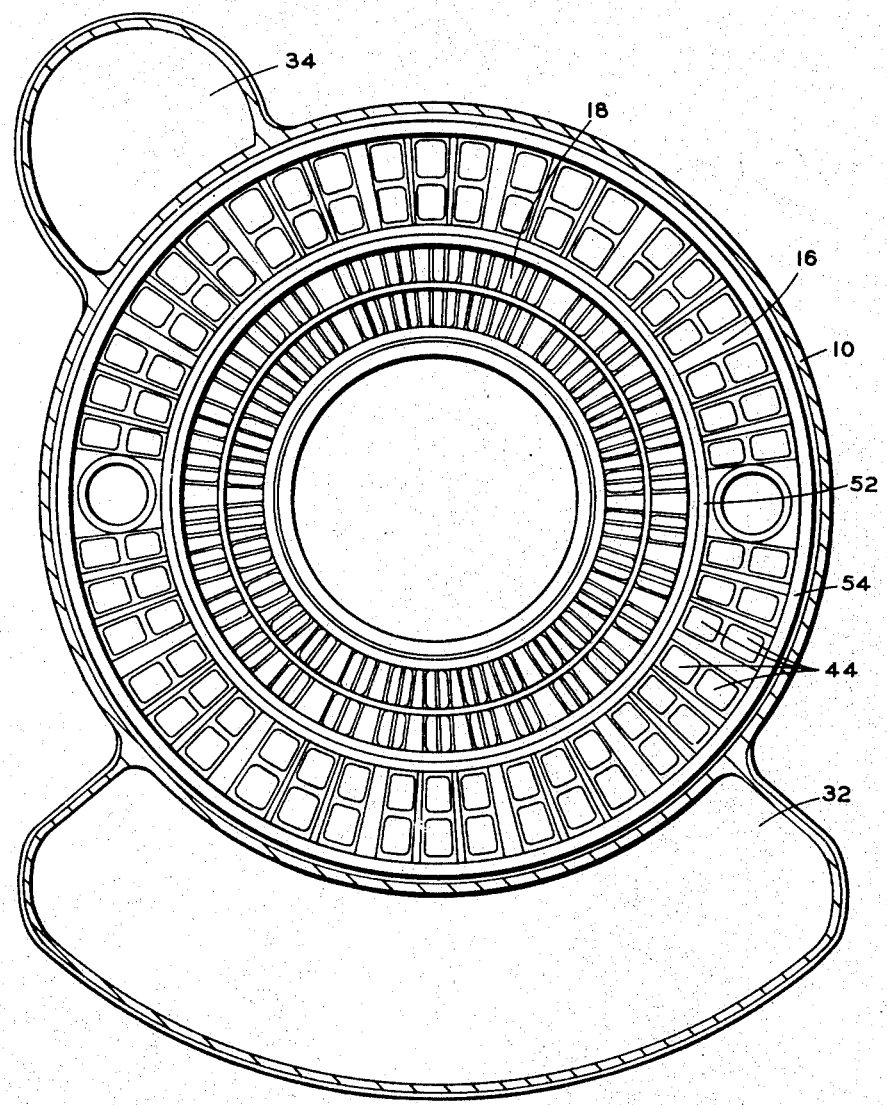
Fig. 2 is an inverted sectional view on line 2—2 of Fig. 1.

The set of intake valves 16 includes a circular base 36 having a number of radial U-shaped grooves 38 therein. The opposite surfaces of each groove which form valve sets 40 extend at acute angles to the axis of the compressor. One or more large circular slots 42 in the base intersect grooves 38 to form gas passages 44, Fig. 2, through which gas enters the compressor cylinder.

Figure 3:
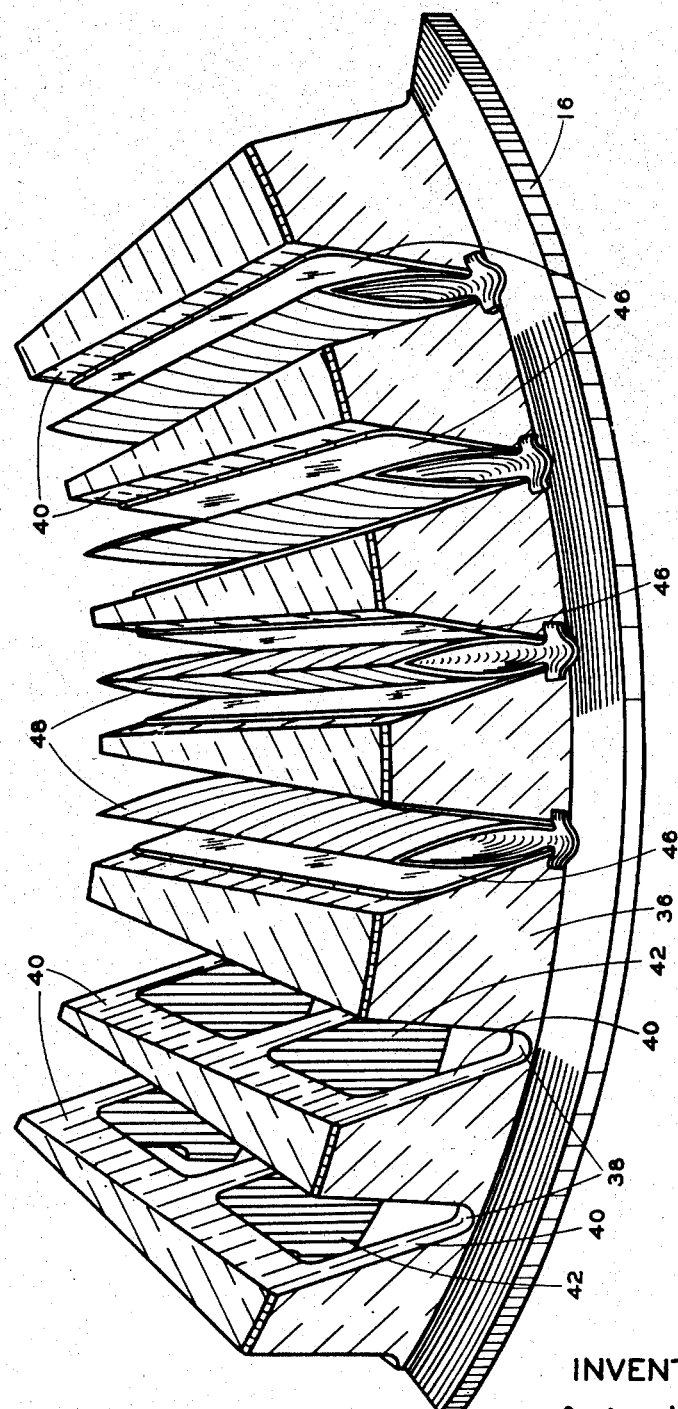
Fig. 3 is a perspective view of a part of a set of intake valves.

In each of grooves 38 is a U-shaped elastic valve plate 46, the arms of which rest against the opposed surfaces of the groove as shown in Fig. 3. The valve plates are held in position by splitter vanes 48 having curved leading edges engaging in the bases of the valve plates to hold the latter within the slots. By the clamping action of the splitter vane each U-shaped valve plate becomes in effect two separate valves rigidly supported at their leading edges and free to bend away from the valve seat in opening the passages through the valve base.

Each splitter vane has laterally projecting lugs 50 adjacent its leading edge to be engaged by clamping rings 52 and 54. These rings hold the splitter vanes securely in position and may be threaded for attachment to the compressor head. This valve structure is described and claimed in the copending application of Kalitinsky, Serial No. 520,059 now patent No. 2,523,376, September 26, 1950.

In accordance with the present invention the valve plates are so constructed that the natural frequency of the valve when supported in the manner shown has a predetermined ratio to the frequency of the compressor when operating at full load. For example, the suction valve should be constructed, either by changing the spring rate or the mass of the valve, so that the valve frequency will be from six to nine times the frequency of the compressor. The discharge valve which remains open generally a shorter time preferably has a frequency ratio of from nine to fifteen times as great as the full load frequency of the compressor.

The conventional compressor normally operates at a substantially constant speed either at full load or at a predetermined percentage of full load so that the frequency ratio is taken with respect to full load frequency or the normal operating frequency of the compressor.

The variation in frequency of a free-piston compressor between idling and full load is much smaller than the change of frequency in conventional compressors and for this reason this valve arrangement with the frequency ratios above outlined is particularly adapted for this type of compressor.

Figure 4:
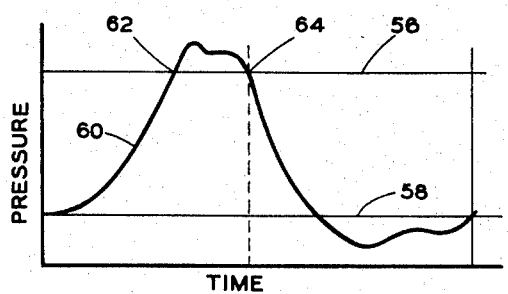
Fig. 4 is a diagram in which the compressor pressure is plotted against time.
Figure 6:
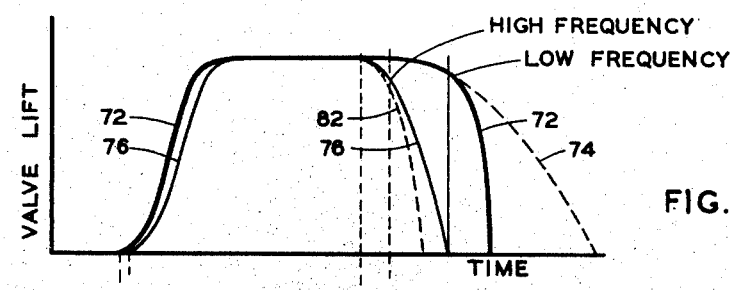
Fig. 6 is a diagram in which the valve lift is plotted against time.
Figure 5:
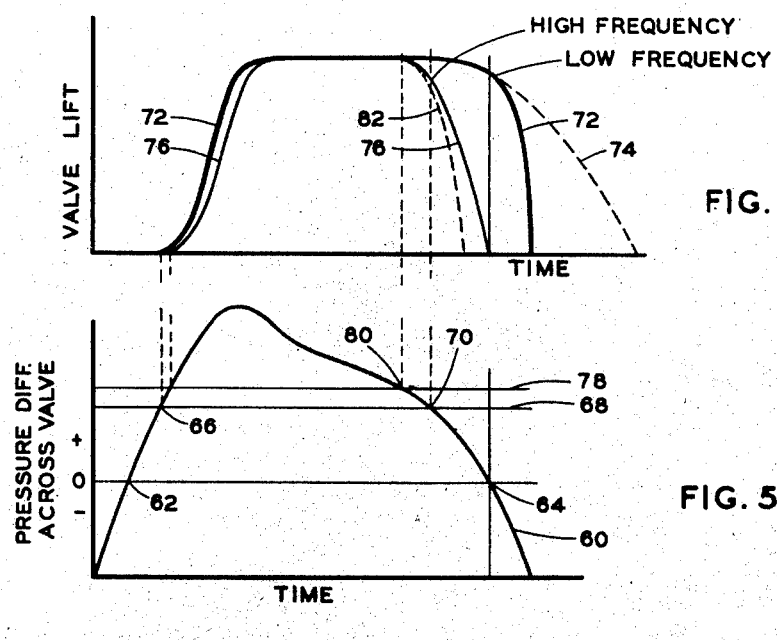
Fig. 5 is a diagram in which the pressure differential on the discharge valve is plotted against time.

The particular advantage of the frequency ratios shown will be apparent from the diagrams of Figs. 4, 5 and 6. In Figure 4 in which the compressor pressure is plotted against time to show the change of pressure for each complete compressor cycle, the line 56 represents the discharge pressure for the compressor and the line 58 represents the inlet pressure which, if the intake valves open to atmosphere, would be atmospheric pressure. From the intersection of the pressure line 60 with the discharge pressure line 56 indicated at 62 to the point where the discharge valve closes (intersection 64) the pressure is above the discharge pressure for the compressor and the valve is open for the escape of compressed air. For clarity, the part of the pressure-time curve during which the discharge valve is open has been replotted in Fig. 5 to show the pressure differential existing across the discharge valve. Thus, the pressure line 60 crosses the zero pressure differential line prior to the point 66 at which the discharge valve opens since a substantial pressure is necessary to cause opening of the valve. The pressure continues to rise for a short interval after the valve opens and then begins to drop until the line 60 intersects the line 68, representing the pressure at which the valve openings, at the point 70 and at the end of the compressor stroke the line 60 again crosses the zero pressure differential line.

With reference to Fig. 6 which is plotted on the same scale as Fig. 5 and compares the lift of the valve with respect to time the line 72 represents the lift of a valve having a low frequency or low spring rate. This valve opens when the pressure differential across the valve is high enough to move the valve and remains fully open until that point in the compressor stroke when the pressure across the valve has dropped to an amount less than sufficient to keep the valve open.

If the valve were to close freely the rate of closing would be represented by the dotted line 74. However, during the closing of the valve the pressure in the compressor cylinder continues to drop until it reaches a point where there is suction in the compressor. Since the valve is not closed at this point which corresponds to the end of the compressor stroke, the reverse flow of air slaps the valve down rapidly against the seat with sufficient impact frequently to break the valve.

To avoid this difficulty the valve frequency is increased so that the opening and closing of the valve will be represented by the line 76, Fig. 6. This increase of frequency may result from a change in spring dimension or spring material by which to affect the spring rate. The pressure at which the valve opens and closes is then represented by the line 78, Fig. 5, so that the spring instead of beginning to close at a point corresponding to the point 70, Fig. 5, begins to close earlier at the point 80. With a higher frequency the normal free movement of the valve in closing would be along the line 82, Fig. 6. However, air is still flowing through the valve structure and the spring cannot close as represented by line 82 but is caused to close more slowly so that the point at which the valve engages the seat corresponds to the dead center or end of the compressor stroke. From this it will be clear that a change in the valve frequency may make possible the continued operation of the valve without breakage where a valve of another frequency might be damaged in a short time.

To assure the operation of the suction valve so that its lift will conform substantially to the curve 76 of Fig. 6, it has been found that the natural frequency of the valve must be several times the natural frequency of the compressor. The most advantageous frequencies for the suction valve are between six and nine times the frequency of the compressor. The more rapid opening and closing of the discharge valve necessitates a higher frequency which has been found to be most advantageous between nine and fifteen times the frequency of the compressor.

As will be apparent from Fig. 5, the suction valve stays open a longer period of time than the discharge valve and its rate of opening and closing are, therefore, generally slower. Thus, in the construction of the suction valve it is advantageous that its frequency be lower than the frequency of the discharge valve.

Figure 7:
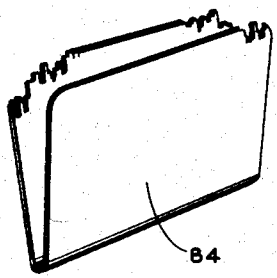
Fig. 7 is a perspective view of a valve showing the type of failure overcome by the invention.

In Fig. 7 is shown a valve which has failed typically by not having the proper frequency with respect to the unit. This valve has its outer or free edge nibbled away where it engages the valve seat with the greatest impact. This failure may result in a very short operating time if the frequency of the valve is not within the above defined range.

It is to be understood that the invention is not limited to the specific embodiment herein illustrated and described, but may be used in other ways without departure from its spirit as defined by the following claims.

I claim:

1. A free-piston unit including an engine cylinder and piston, a compressor cylinder and piston, the pistons being interconnected to form a reciprocating piston assembly, and the cylinders being interconnected, air spring cylinder and piston elements, one of said elements being connected to and forming a part of the piston assembly, the other element being connected to said cylinders, the frequency of reciprocation of the piston assembly being a function of its mass and the pressures acting thereon, in combination with suction and discharge valves in at least one end of the compressor cylinder to provide for inflow of air into and discharge of air from said compressor cylinder, said suction valve being a flap valve including a valve seat, and a resilient valve plate secured along one edge to the seat and being movable away from said seat for the passage of air through the valve, said plate being closed by its natural elasticity, said valve plate having a natural frequency of approximately six to nine times the maximum frequency of the compressor.

2. A free-piston unit including an engine cylinder and piston, a compressor cylinder and piston, the pistons being interconnected to form a reciprocating piston assembly, and the cylinders being interconnected, air spring cylinder and piston elements, one of said elements being connected to and forming a part of the piston assembly, the other element being connected to said cylinders, the frequency of reciprocation of the piston assembly being a function of its mass and the pressures acting thereon, in combination with suction and discharge valves in at least one end of the compressor cylinder to provide for inflow of air into and discharge of air from said compressor cylinder, said discharge valve being a flap valve including a valve seat, and a resilient valve plate secured along one edge to the seat and being movable away from said seat for the passage of air through the valve, said plate being closed by its natural elasticity, said valve plate having a natural frequency of approximately from nine to fifteen times the maximum frequency of the compressor.

3. A free-piston unit including an engine cylinder and piston, a compressor cylinder and piston, the pistons being interconnected to form a reciprocating piston assembly, and the cylinders being interconnected, air spring cylinder and piston elements, one of said elements being connected to and forming a part of the piston assembly, the other element being connected to said cylinders, the frequency of reciprocation of the piston assembly being a function of its mass and the pressures acting thereon, in combination with suction and discharge valves in at least one end of the compressor cylinder to provide for inflow of air into and discharge of air from said compressor cylinder, each of said valves being a flap valve including a valve seat, and a resilient valve plate secured along one edge to said seat and being movable away from said seat for the passage of air through the valve, said plate being closed by its natural elasticity, said valve plate having a natural frequency of approximately from six to fifteen times the maximum frequency of the compressor.

ANDREW KALITINSKY.

REFERENCES CITED

The following references are of record in the file of this patent:

UNITED STATES PATENTS

| Number | Name | Date |
| --- | --- | --- |
| 181,535 | Painter | Aug. 29, 1876 |
| 282,090 | Kennish | July 31, 1883 |
| 1,599,414 | Huff | Sept. 14, 1926 |
| 1,973,103 | Replogle | Sept. 11, 1934 |
| 2,000,883 | Cullen et al. | May 7, 1935 |
| 2,019,747 | Taylor | Nov. 5, 1935 |
| 2,110,691 | Aikman | Mar. 8, 1938 |
| 2,160,401 | Angelman | May 30, 1939 |